United States Patent
Hanlin et al.

(10) Patent No.: US 10,657,608 B2
(45) Date of Patent: May 19, 2020

(54) ENGINEERING CHANGE MANAGEMENT SYSTEM

(71) Applicant: Shem, LLC, Hagerstown, IN (US)

(72) Inventors: Thesa Hanlin, Winchester, IN (US); James M. Johnston, Richmond, IN (US); Nathan Redden, Dunreith, IN (US); Andrew Taitz, Highland Park, IL (US)

(73) Assignee: Shem, LLC, Hagerstown, IN (US)

( * ) Notice: Subject to any disclaimer, the term of this patent is extended or adjusted under 35 U.S.C. 154(b) by 861 days.

(21) Appl. No.: 14/846,044

(22) Filed: Sep. 4, 2015

(65) Prior Publication Data

US 2016/0098034 A1 Apr. 7, 2016

Related U.S. Application Data

(60) Provisional application No. 62/046,294, filed on Sep. 5, 2014.

(51) Int. Cl.
*G06Q 50/04* (2012.01)
*G05B 19/418* (2006.01)

(52) U.S. Cl.
CPC ......... *G06Q 50/04* (2013.01); *G05B 19/4188* (2013.01); *G05B 2219/31395* (2013.01); *G05B 2219/31403* (2013.01); *G05B 2219/32082* (2013.01); *Y02P 90/20* (2015.11); *Y02P 90/24* (2015.11); *Y02P 90/30* (2015.11)

(58) Field of Classification Search
CPC ............................ G06Q 50/04; G05B 19/4118
USPC .......................................................... 700/26
See application file for complete search history.

(56) References Cited

U.S. PATENT DOCUMENTS

| | | | | |
|---|---|---|---|---|
| 7,133,834 B1* | 11/2006 | Abelow | ............... | G06Q 10/101 705/7.32 |
| 2004/0064351 A1* | 4/2004 | Mikurak | ............... | G06Q 10/087 705/22 |
| 2005/0216429 A1* | 9/2005 | Hertz | ...................... | G06Q 10/06 |
| 2009/0259612 A1* | 10/2009 | Hanson | ................... | H04L 69/22 706/47 |

* cited by examiner

*Primary Examiner* — Huan Hoang
*Assistant Examiner* — Muna A Techane
(74) *Attorney, Agent, or Firm* — Banner & Witcoff, Ltd.

(57) ABSTRACT

A change management system is configured to control communication between one or more engineering subsystems utilized in the design and/or manufacture of a component. The change management system may be configured to facilitate communication between one or more engineering subsystems that are fragmented and/or not configured to communicate with one another. Further, the change management system may be configured to act as a virtual user when interfacing with one or more of the engineering subsystems. Additionally, the change management system may be configured to check data from one or more of the subsystems for compliance with one or more control rules governing the progression of a manufacturing/design project.

22 Claims, 7 Drawing Sheets

ENGINEERING CHANGE MANAGEMENT SYSTEM

CROSS-REFERENCE TO RELATED APPLICATION

This application is a non-provisional of, and claims priority to, U.S. Provisional Application No. 62/046,294, filed Sep. 5, 2014, which prior application is incorporated by reference herein in its entirety and made part hereof.

TECHNICAL FIELD

The present invention generally relates to a system for management of engineering orders or projects and, in some more specific embodiments, to a system for managing the design and manufacture of an engineering component.

BACKGROUND

Multiple computer-implemented systems may be utilized in the design and manufacture of a new engineering product. Such systems for design and manufacture of an engineering component may be subject to a plurality of interrelated actions (e.g., decisions, physical or mental tasks, etc.), where a first action may affect one or more other design and/or manufacturing actions during the design and manufacture processes. The use of these different systems in processing different actions throughout the design and manufacture processes can result in the actions being handled in an improper order or certain tasks being inadvertently omitted. Additionally, such systems, while facilitating communication of some information therebetween, may not be able to track and/or accommodate one or more actions that have implications for other design and/or manufacturing actions in another of such systems. In this way, these systems may be fragmented, such that communication of pertinent engineering information between the systems is limited. As such, a need exists to establish robust communication and compatibility between multiple of such fragmented engineering systems.

BRIEF SUMMARY

A change management system, which may be an engineering change management system, is configured to control communication between one or more engineering, or other administrative or enterprise subsystems utilized, for example, in the design, manufacture, and/or service of a component. In one example, a change management system may be configured to control communication between multiple devices by receiving and analyzing data at a central control system device. Accordingly, in one example, the change management system may be configured to facilitate communication between one or more subsystems (e.g., engineering subsystems) that are fragmented and/or not configured to communicate with one another. Further, the change management system may be configured to act as a virtual user when interfacing with one or more of the subsystems. Additionally, the change management system may be configured to check data from one or more of the subsystems for compliance with one or more control rules governing the progression of a manufacturing/design project.

Aspects of this disclosure address one or more of the issues mentioned above by disclosing methods, systems, non-transitory computer readable media, and apparatuses for establishing compatibility between an open-source data warehouse and a proprietary data warehouse. Such a system may be a computer-implemented system that includes at least one memory configured for storing information, at least one computer processor connected to the at least one memory, and one or more systems or sub-systems operated by the at least one computer processor. Aspects of the disclosure may also be provided in a non-transitory computer-readable medium having computer-executable instructions to perform one or more of the process steps described herein and/or to operate a computer-implemented system as described below.

Aspects of the disclosure relate to a computer-implemented management system that includes at least one memory configured for storing information, at least one computer processor connected to the at least one memory, a plurality of sub-systems operated by the at least one computer processor, and a control system operated by the at least one computer processor and connected to all of the sub-systems. The sub-systems include a sales configuration system configured for receiving a request for a project for implementing a new engineering component, a design system configured for receiving design input data to create a computer-implemented model of the new engineering component, a material requirements planning system configured for identifying components necessary for implementing the new engineering component, a manufacturing instructions system configured for creating a plurality of instructions for implementing the new engineering component, and a service system including a database stored in the memory, the service system configured for receiving and storing project information from at least one other sub-system. The control system is configured for controlling exchange of information between two or more of the sub-systems for completion of the project. In one embodiment, the control system and each of the sub-systems may be operated by separate computer program modules stored in the at least one memory.

According to one aspect, the control system is configured for receiving the information for completion of the project, analyzing the information based on a set of rules, and determining an action to be taken by one or more of the sub-systems. The control system may further be configured such that when the information is received from a first sub-system, and the information complies with the rules, the control system is configured for determining that the action is to be taken by a subsequent sub-system to advance completion of the project, and when the information does not comply with the rules, the control system is configured for determining that the action is to be taken by the first sub-system to supplement the information to comply with the rules. Additionally or alternately, the control system may be configured such that the information is exchanged between the two or more sub-systems by a first sub-system transmitting the information to the control system, and the control system then transmitting the information to a second sub-system.

According to another aspect, the sub-components are configured for displaying selected information to a user, and wherein the selected information further includes an indication of any changes in the selected information that were not previously displayed to the user.

According to a further aspect, the new engineering component is a sub-component of an engineering product, and the sales configuration system is configured for receiving quoting information regarding at least one of a feasibility, a complexity, a timeline, and a cost associated with implementing the new engineering component. The sales configuration system is further configured for generating a quote for the new engineering component based on the quoting information.

According to yet another aspect, the design system includes computer-aided design software configured for creating the computer-implemented model.

According to a still further aspect, the material requirements planning system is further configured for determining a current inventory status of the components identified.

According to an additional aspect, the new engineering component is a sub-component of an engineering product, and wherein the plurality of instructions created by the manufacturing instructions system include an instruction for installing the new engineering component on the engineering product.

Additional aspects of the disclosure relate to a computer-implemented management system that includes at least one memory configured for storing information, and at least one computer processor connected to the at least one memory, wherein the processor is configured for processing an order for implementing a new engineering component. In processing the order, the processor is configured for receiving the order, creating a computer-implemented model of the new engineering component, identifying components necessary for implementing the new engineering component, creating a plurality of instructions for implementing the new engineering component, and receiving input from a plurality of responsible parties regarding at least one of a feasibility, a complexity, a timeline, and a cost associated with implementing the new engineering component. The processor is further configured for generating a quote for implementing the new engineering component based on the input, after creating the computer-implemented model, identifying the components, and creating the plurality of instructions are complete, receiving approval of the quote from the user, and taking further actions to assist in completion of the order, after receiving the approval of the quote, where the further actions to assist in completion of the order are refused until the approval is received.

According to one aspect, computer-aided design software is used for receiving design input to create the computer-implemented model.

According to another aspect, the at least one computer processor is further configured for determining a current inventory status of the components identified.

According to a further aspect, the new engineering component is a sub-component of an engineering product, and wherein the plurality of instructions include an instruction for installing the new engineering component on the engineering product.

According to yet another aspect, the at least one computer processor is further configured for processing future orders for implementing the new engineering component after completion of the order.

Further aspects of the disclosure relate to a computer-implemented management system that includes at least one memory configured for storing information, at least one computer processor connected to the at least one memory, a plurality of sub-systems operated by the at least one computer processor, and a control system operated by the at least one computer processor and connected to all of the sub-systems, where the control system is configured for controlling exchange of information among the sub-systems and for controlling execution of the plurality of processes for completing the order. In accordance with this functionality, the control system is configured for receiving first data from a first sub-system after the first sub-system executes a first process, comparing the first data to a first control rule to determine compliance with the first control rule, transmitting the first data to a second sub-system for execution of a second process if the first data is determined to comply with the first control rule, and transmitting an instruction to the first sub-system to remedy non-compliance if the first data is determined to not comply with the first control rule. In one embodiment, the control system and each of the sub-systems may be operated by separate computer program modules stored in the at least one memory.

According to one aspect, the control system is further configured for controlling exchange of the information among the sub-systems and for controlling execution of the plurality of processes until all of the plurality of processes are executed and the order is complete.

According to another aspect, if the first data is determined to not comply with the first control rule, the control system is further configured for determining whether at least one other sub-system is affected by the non-compliance. Additionally, if at least one other sub-system is determined to be affected by the non-compliance, the control system is further configured for transmitting an instruction to the at least one other sub-system to remedy non-compliance.

According to a further aspect, the order is an order for production of a new engineering component, and the plurality of sub-systems include a sales configuration system configured for receiving the order, a design system configured for creating a computer-implemented model of the new engineering component, a material requirements planning system configured for identifying components necessary for implementing the new engineering component, and a manufacturing instructions system configured for creating a plurality of instructions for implementing the new engineering component.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements.

DETAILED DESCRIPTION

Figure 1:
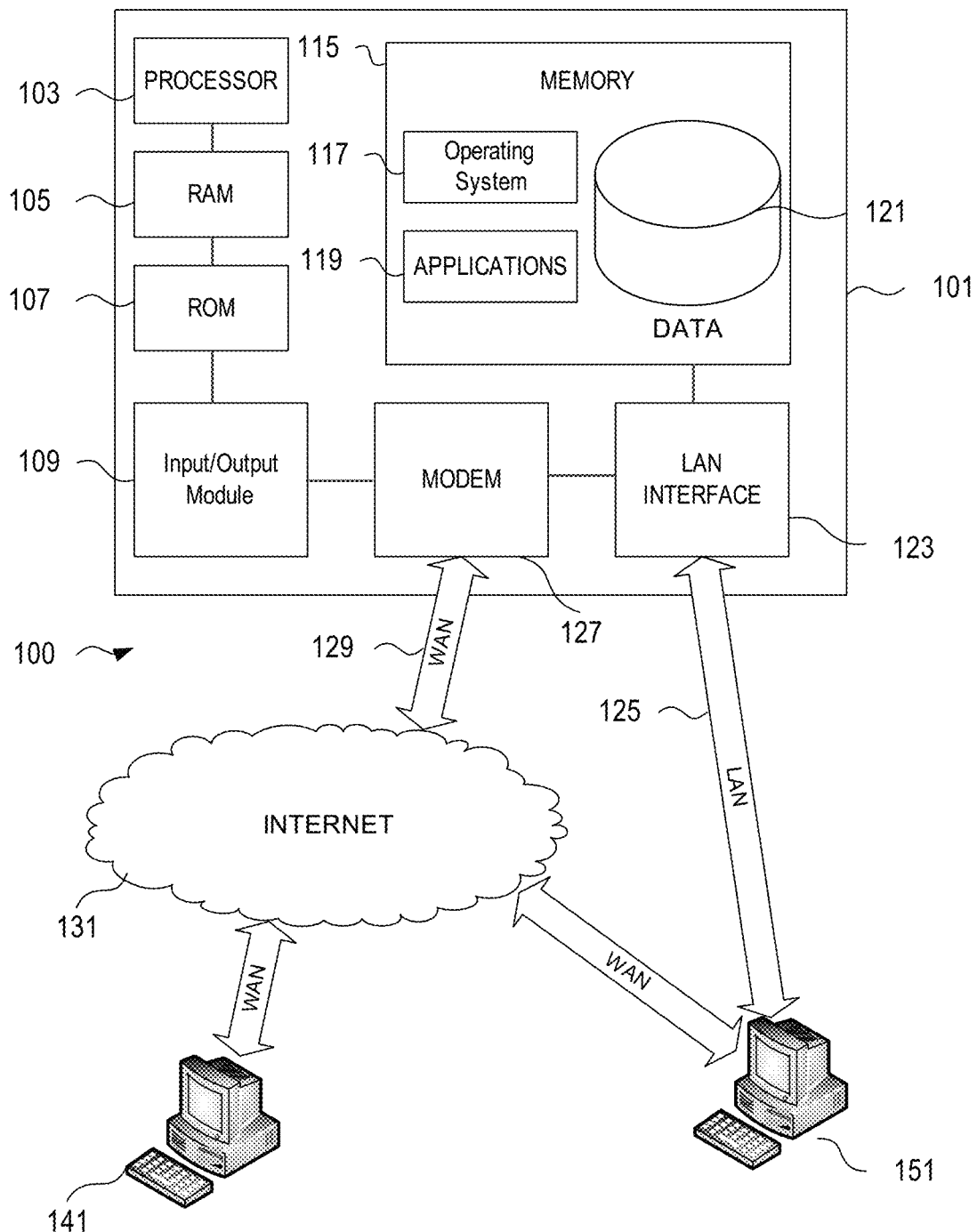
FIG. 1 schematically depicts one embodiment of a computer device capable of functioning as a change management system according to aspects of the disclosure.

While this invention is susceptible of embodiment in many different forms, there are shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

As discussed above, multiple computer-implemented systems may be utilized in connection with the design and manufacture of a new engineering component, which may be a modification of an existing component or an entirely new component. For example, a customer (user) may submit, to an engineering company or other entity, a request to design and manufacture a component. Specifically, this request may be for a modification of an existing component and/or for the creation of a new component, and such a component may be a stand-alone product or a component of a larger engineering product (e.g. a vehicle, such as a truck). This request may be facilitated by a sales configuration system, wherein the sales configuration system may be utilized to generate a first set of information to determine a cost associated with the design and manufacture of the requested component, to prepare a quote for the requesting customer, among other actions. Upon completion of the order (e.g., acceptance of the quote by the customer), the request may be passed to an engineering design system, which may include computer-aided design (CAD) software, for engineering design. Subsequently, the designed component may be processed by a material requirements planning (MRP) system, which may be utilized to check inventory, generate purchase orders associated with sub-components that may make up the requested component, and the like. Additionally, the MRP system may communicate information to a manufacturing instructions system, which may, in turn, generate steps of a manufacturing process to be carried out by technicians and/or machines to fabricate the component. It is understood that other systems may be used or otherwise incorporated within the design and manufacturing process.

In one embodiment, a system is provided to communicate design and manufacturing actions, in addition to identifying and resolving conflicts/interactions associated with the actions, between one or more engineering systems utilized to design and/or manufacture a new component. In one example, said new component may be utilized in a larger engineering product or system having known engineering specifications. For example, in one embodiment, the systems and methods described herein may be utilized by a manufacturing entity that produces vehicles (e.g. trucks) that may be customized with user-specified subcomponents. Such user-specified components may include components with various aspects specified by a consumer, such as structural specifications, functional specifications, aesthetic specifications, etc. As such, the systems and methods described herein relate to an engineering system for management of design, manufacture, and service processes associated with an engineered product, and specifically, a change/revision/new design of a component of said engineered product. Accordingly, in one example, this system may be referred to as a change management system.

In the context of this disclosure, a change management system, which may be an engineering change management system, may comprise hardware, firmware and software utilized to control one or more aspects of a design, manufacture, and other enterprise services associated with production of one or more engineering components, taking into account a plurality of design and/or manufacturing rules for a first sub-system that may affect one or more additional upstream and/or downstream sub-systems. Accordingly, with reference to FIG. 1, the change management system may be embodied as a specific-purpose or specialized computing system 100. Furthermore, those of ordinary skill in the art will appreciate that the computing system 100 may comprise processing hardware configured for intensive and/or high volume calculations in order to address complex interactions between multiple devices and systems utilized to design, test, manufacture, and service engineering projects comprising a plurality (in some cases tens or hundreds of thousands) of sub-components, and the like. As such, engineering change management system 100 may include one or more connected computer devices, such as devices 101, 141, and/or 151. Further, in one example, change management system 100, or similarly, change management system 200, may include one or more sub-systems, such as systems 202-212 from FIG. 2, wherein a sub-system may be implemented as one or more computer devices, such as device 101, 141, and/or 151.

In one example implementation, computing device 101 may have a processor 103 for controlling the overall operation of the device 101 and its associated components, including RAM 105, ROM 107, an input/output (I/O) module 109, and memory 115. In one example, as will be apparent to those of ordinary skill in the art, memory 115 may comprise any known form of persistent and/or volatile memory, such as, among others, a hard disk drive, a solid state disk, optical disk technologies (CD-ROM, DVD, Blu-ray, and the like), tape-based stored devices, ROM, and RAM, or combinations thereof. In this way, memory 115 may comprise a non-transitory computer-readable medium that may communicate instructions to processor 103 to be executed.

I/O module 109 may include a microphone, keypad, touch screen, and/or stylus through which a user of the computing device 101 may provide input, and may also include one or more of a speaker for providing audio output and/or a video display device for providing textual, audiovisual and/or graphical output. Software may be stored within memory 115 and/or storage to provide instructions to the processor 103 for allowing the computing device 101 to perform various functions. For example, memory 115 may store software used by the computing device 101, such as an operating system 117, application programs 119, and an associated database 121. The processor 103, and its associated components, may allow the computing device 101 to run a series of computer-readable instructions to process and format data.

The computing device 101 may operate in a networked environment supporting connections to one or more remote computers, such as computing devices 141 and 151. In one example, the computing devices 141 and 151 may be personal computers or servers that include many, or all, of the elements described above relative to the computing device 101. Alternatively, computing device 141 and/or 151 may be a data store that is affected by the operation of the computing device 101. The network connections depicted in FIG. 1 include a local area network (LAN) 125 and a wide area network (WAN) 129, but may also include other networks. When used in a LAN networking environment, the computing device 101 is connected to the LAN 125 through a network interface or adapter 123. When used in a WAN networking environment, the computing device 101 may include a modem 127 or other means for establishing communications over the WAN 129, such as the Internet 131. It will be appreciated that the network connections shown are illustrative and other means of establishing a communications link between the computers may be used.

The existence of any of various well-known protocols such as TCP/IP, Ethernet, FTP, HTTP and the like is presumed. Accordingly, communication between one or more of computing devices 101, 141, and/or 151 may be wired or wireless, and may utilize Wi-Fi, a cellular network, Bluetooth, infrared communication, or an Ethernet cable, among many others.

Additionally, an application program 119 used by the computing device 101 according to an illustrative embodiment of the disclosure, may include computer-executable instructions for invoking functionality related to management of design, manufacture, and service processes associated with an engineering product, and specifically, for communication of one or more rules associated with the design and/or manufacture of a sub-component of the engineered product between one or more sub-systems of a change management system.

The computing device 101 and/or the other devices 141 or 151 may also be mobile devices, such as smart phones, personal digital assistants (PDAs), smart watches, and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
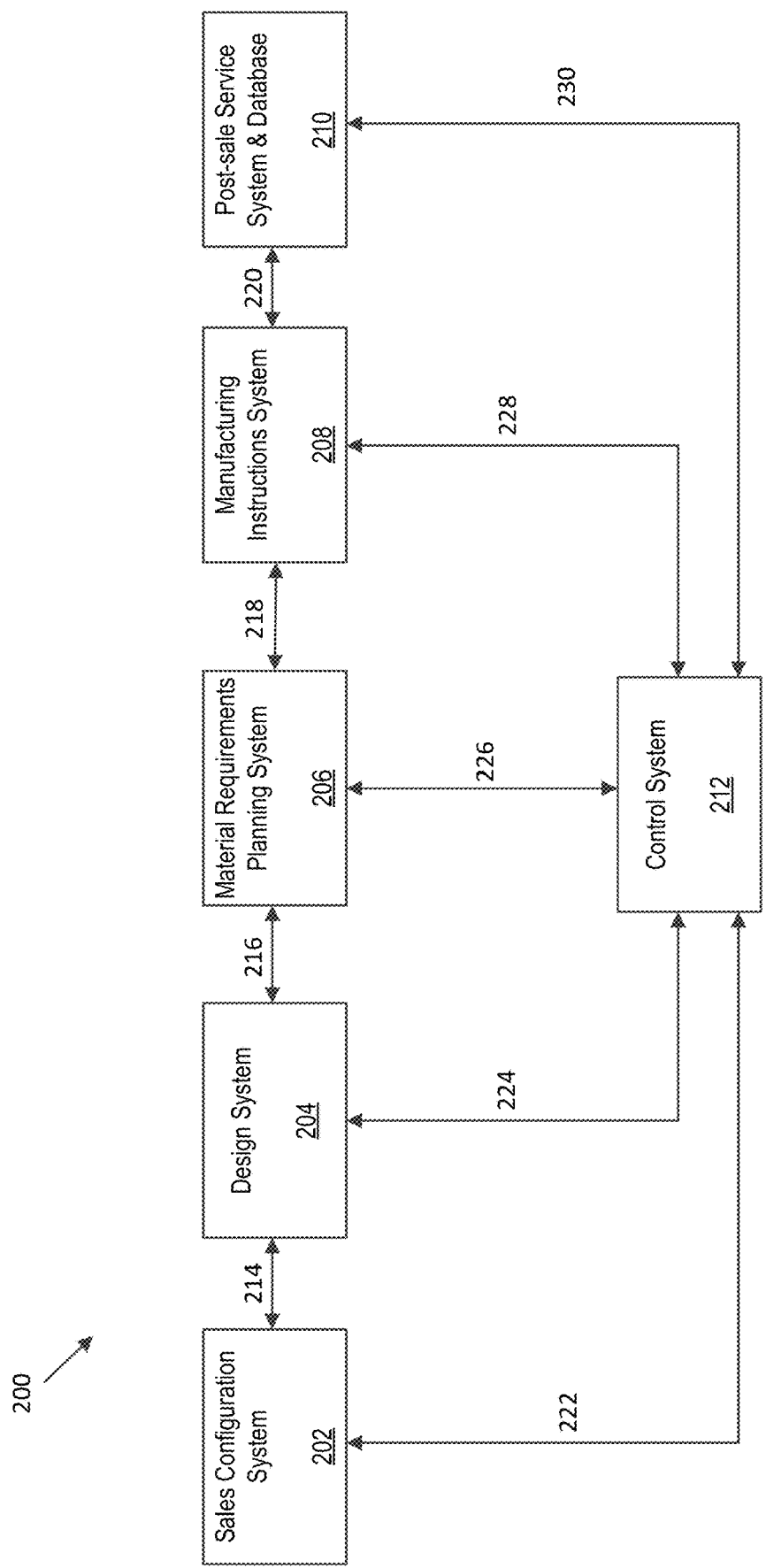
FIG. 2 is a schematic block diagram of one implementation of a change management system according to aspects of the disclosure.

FIG. 2 schematically depicts a change management system 200. In one example, change management system 200 may be similar to system 100 from FIG. 1, and may be implemented on one or more computer devices 101. In particular, change management system 200 may comprise one or more sub-systems 202-212. Specifically, one embodiment of the change management system 200 may include a sales configuration system 202. Sales configuration system 202 may be utilized to receive a request from a user for a new engineering component. In one implementation, the requested engineering component may comprise a modification/design revision to a sub-component of a larger engineering product. In this way, sales configuration system 202 facilitates a request for a customized component to be designed and/or manufactured as part of an engineering product that comprises a plurality of different components.

In one implementation, sales configuration system 202 may communicate with one or more of a purchasing team, a quality control/assurance team, a manufacturing team, and/or a sales team to receive input regarding the new engineering component. As such, the one or more teams may provide quoting information to the sales configuration system 202 related to the feasibility, complexity, timeline, and/or cost associated with implementing the requested engineering component (otherwise referred to as a "new order"). Accordingly, sales configuration system 202 may be utilized to generate a quote for the aforementioned user, which may be based on the quoting information. Further, the input/display of information from the user, in addition to the aforementioned purchasing team, quality control team, manufacturing team, and/or sales team, may be facilitated by a graphical user interface (GUI) generated for display on a display device, such as that described in relation to FIG. 1.

In one example, upon approval by the user (otherwise referred to as the client/customer) of the quote for a new engineering component, the new order is communicated to design system 204. In one example, design system 204 includes one or more processes configured to facilitate computer-aided design of the new engineering component, such as various computer-aided design programs, without departing from the scope of the disclosures described herein. As such, one or more engineers may input design data or information to design system 204 to design a computer-implemented model of the requested engineering component.

In one example, upon completion of the new order design using the design system 204, the project data is passed to the material requirements planning system 206. Accordingly, the material requirements planning system 206 may be utilized to keep track of inventory and/or purchase orders, etc. As such, the material requirements planning system 206 may be utilized to process a design from the design system 204, breaking said design down into constituent components and/or identifying the constituent components necessary to produce the design. The material requirements planning system 206 may receive information from any of the other systems 202-210 for this purpose, e.g., information from the design system 204 and/or information from the sales configuration system 202. Accordingly, material requirements planning system 206 may execute one or more processes to check a current inventory status of components available, identify one or more components which may need to be purchased, and/or other such actions. Those of ordinary skill in the art will recognize various different material requirements planning systems, including commercially-available software, that may be utilized with system 206 without departing from the scope of the disclosures described herein.

In one implementation, upon completion of one or more material requirements planning processes, by material requirements planning system 206, the new order is passed to manufacturing instructions system 208. In one example, manufacturing instructions system 208 executes one or more processes to break down a designed component into one or more manufacturing steps to be completed by technicians. As such, manufacturing instructions system 208 may break down a manufacturing project into a plurality of instructions to be completed based upon, for example, a tool type, an expertise of a technician, a level of complexity of an instruction, an order of assembly of a product, and the like. The manufacturing instructions system 208 may utilize information from any of the other systems 202-210 for this purpose, including, e.g., the sales configuration system 202, the design system 204 and/or the material requirements planning system 206. For example, the manufacturing instructions system 208 may utilize the computer-implemented model created by the design system 204 and/or the sub-components identified by the material requirements planning system 206 in creating the instructions for implementation of the new engineering component. Further, those of ordinary skill in the art will understand that various manufacturing instructions systems, including commercially-available software, may be utilized on a manufacturing production floor to break down a design into instructions to be sent to various workstations, without departing from the scope of the disclosures described herein. In one example, the new order is completed upon carrying out those manufacturing instructions identified by the manufacturing instructions system 208. As such, one or more final instructions identified by the manufacturing instructions system 208 may include coupling/installation of the new order onto the larger product produced by the manufacturing company. In this way, the new order may be described as a customized component designed and/or manufactured for a substantially standardized engineering product of which the new component is a sub-component. Again, in one example, the new component may be a sub-component of a standardized truck chassis produced by a manufacturing entity.

In one example, upon completion of the new order by manufacturing instruction system 208, information is passed to the post-sale service system and database 210. The post-sale service system and database 210 stores product information related to the design and manufacture of the new order project, the customer, the product for which the new order project was completed (i.e. the product for which the new order project is a sub-component), information related to servicing the new order project, among many others. As such, post-sale service system and database 210 may be utilized to interact with the customer after the new order project has been installed and is in-use. Further, the post-sale service system and database 210 may be utilized to manufacture one or more additional products using a same design developed for the new order project. The post-sale service system and database 210 may utilize information from any of the other systems 202-210 for this purpose, including, e.g., the sales configuration system 202, the design system 204, the material requirements planning system 206, and/or the manufacturing instructions system 208. For example, the post-sale service system and database 210 may store information regarding the customer and the quote from the sales configuration system 202, the computer-implemented model and/or other design information created by the design system 204, the sub-components identified by the material requirements planning system 206, the instructions created by the manufacturing instructions system 208, etc. in creating the instructions for implementation of the new engineering component.

In one example embodiment, communication between the aforementioned systems 202, 204, 206, 208, and/or 210 may be facilitated by data links 214, 216, 218, and/or 220, as depicted in FIG. 2. Accordingly, data links 214-220 may comprise any known communication technologies including, among others, wired or wireless communication using the Internet, a LAN, a WAN, Bluetooth, near-field communication (NFC), or a cellular network, among many others. Further, one or more of data links 214-220 may facilitate two-way medication between two systems, selected from systems 202-210, as depicted.

In another example, one or more options/decisions made in a first system, selected from systems 202-210, may have one or more implications for one or more upstream/downstream systems 202-210. Specifically, in one example, a component identified by material requirements planning system 206 may not be available in an inventory of on-site components for the manufacturing facility. Instead, material requirements planning system 206 may identify one or more alternative components which may be utilized to fulfill a same design requirement. However, selection of the one or more alternative components may have implications for a 3-D model design developed in the upstream design system 204. For example, one or more features of the component (e.g., mounting brackets or other mounting structure) may need to be adjusted in the 3-D design, as a result of the use of the alternative component. Those of ordinary skill in the art will be able to identify many different interactions between design and/or manufacturing choices made in a first system (from, e.g. systems 202-210) that impact one or more design and/or manufacturing actions in one or more of the same/separate systems, from systems 202-210. Advantageously, control system 212 may be utilized to track and control those complex interactions between those aforementioned systems 202-210.

In one example, control system 212 may be connected to systems 202-210 by communication links 222-230. Accordingly, communication links 222-230 may be wired or wireless, such that control system 212 interacts with one or more of systems 202-210 via the Internet, a LAN, a WAN, Bluetooth, near field communication, a serial link facilitated by a universal serial bus (USB), or a parallel link, among many others. In one example, control system 212 executes one or more processes to facilitate communication between two or more of systems 202-210, which may not be readily compatible with one another, such that communication between the systems is not readily facilitated without the control system 212. Those of ordinary skill in the art will realize that control system 212 may be implemented on dedicated computer hardware. Further, control system 212 may be remote from one or more of systems 202-210, or may be co-located in a same geographic location, or on common computing hardware, among others.

In one example, control system 212 comprises a database of rules, wherein said rules are processed to check that required information for a specific stage of a new order project has been calculated/has been entered by one or more users. In another example, control system 212 executes one or more processes to check that one or more prerequisite rules have been met/passed before information is communicated between a pair of systems, from systems 202-210. In yet another example, control system 212 executes one or more processes to check that an action made in the first system, from systems 202-210, does not affect a design, manufacturing and/or service action in a second (upstream or downstream) system, from systems 202-210. As such, control system 212 may identify an interaction between an action made in a first system (from systems 202-210) and its impact on an action in a second system (from systems 202-210). In this example, control system 212 may take one or more actions in response to detecting an impact of such an action, such as generating a warning to a user, preventing a new order project from progressing to a later stage of the project, automatically sending the project back to an earlier stage in a same or a different system, among others. Control system 212 is described in further detail in relation to FIG. 4.

Furthermore, those of ordinary skill in the art will recognize that change management system 200 should not be limited to those sub-systems 202-212. As such, change management system 200 may, in one implementation, comprise additional and/or alternative sub-systems to those described in relation to systems 202-212. Specifically, change management system 200 may comprise one or more sub-systems configured to execute processes to control administrative and/or enterprise functions in an engineering company or other organization, without departing from the scope of the disclosures described herein.

Figure 3:
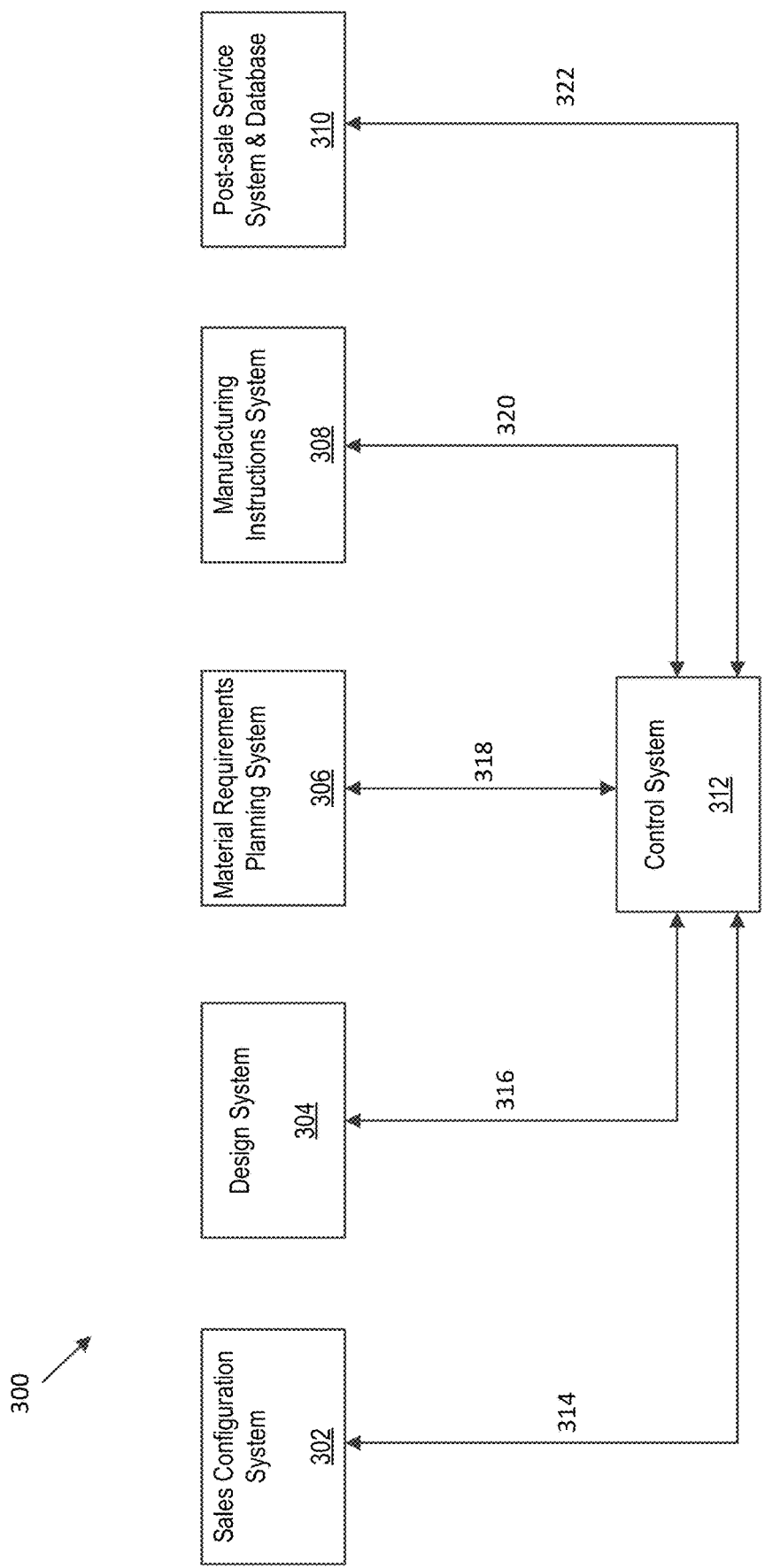
FIG. 3 is a schematic block diagram of another implementation of a change management system according to aspects of the disclosure.

FIG. 3 schematically depicts another embodiment of a change management system 300. As such, change management system 300 may be similar to the system 200 from FIG. 2, and may comprise a sales configuration system 302, a CAD system 304, the material requirements planning system 306, a manufacturing construction system 308, and a post-sale service system and database 310. In contrast to the embodiment of the change management system 200 depicted in FIG. 2, system 300 comprises a control system 312 connected to those systems 302-310 by communication links 314-322, such that the systems 302-310 are not directly connected to each other by communication links. As such, communication between systems 302-310, which may be similar to systems 202-210 from FIG. 2, may be facilitated only by communication through control system 312 by communication links 314-322. Accordingly, in this example embodiment, all data to be passed between said systems 302-312 is communicated through control system 312. Advantageously, the change management system 300 improves processing efficiency by receiving data centrally into control system 312, thereby negating the processing used for communication between multiple stages of system 300, such as between system 302 and system 306, and the like. In this way, system 300 may be utilized to reduce the number of processing cycles used to receive, analyze, and re-package for further communication between multiple systems connected in series, such as between those elements 202 and 210 connected in series in FIG. 2.

Figure 4:
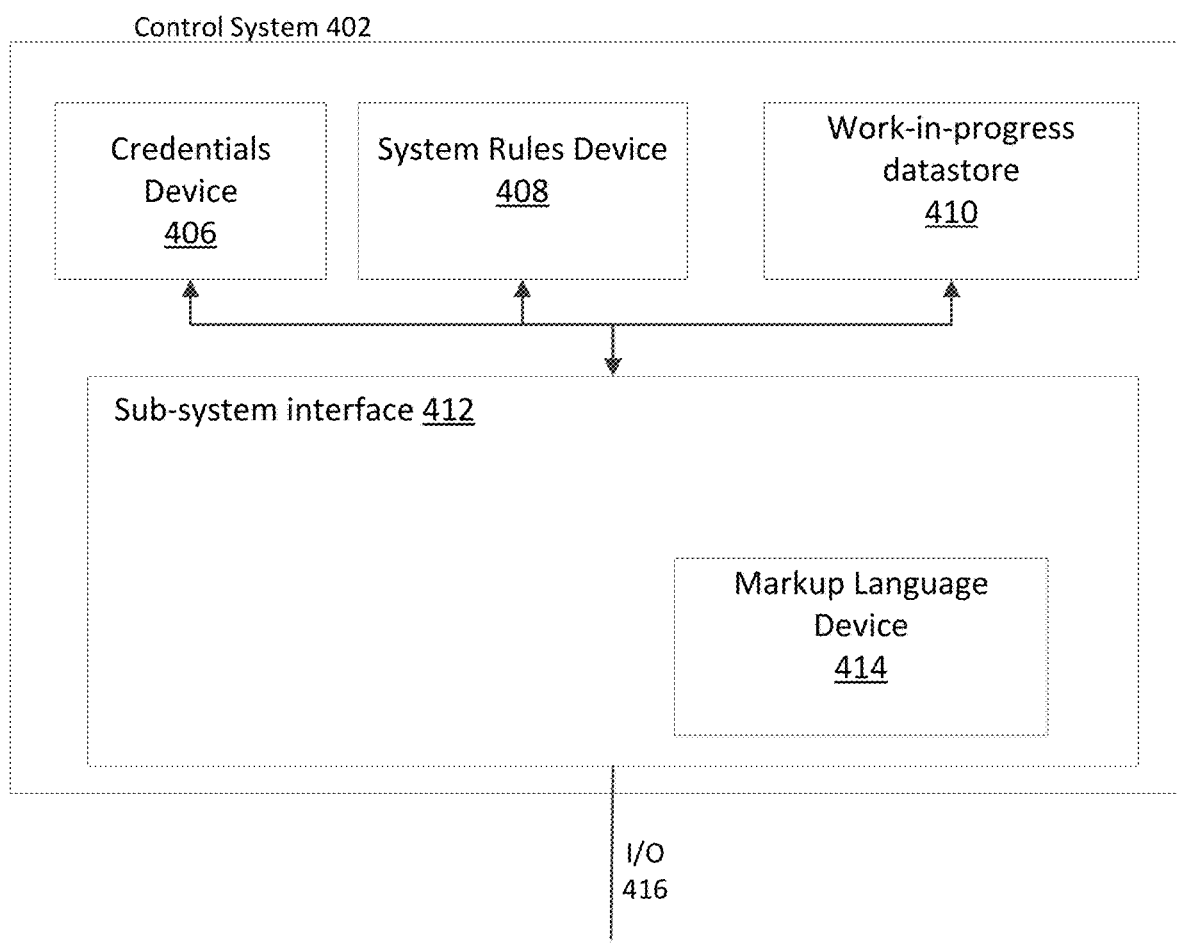
FIG. 4 is a schematic block diagram of a control system for a change management system according to aspects of the disclosure.

FIG. 4 schematically depicts one embodiment of a control system 402. Accordingly, in one example, the control system 402 comprises elements 406-414, wherein said elements may be embodied as hardware devices, including one or more processor devices and/or dedicated data manipulation circuitry (FPGA, ROM, ASIC, and the like), as software devices or modules, or as one or more combinations of software, hardware and/or firmware. As such, in one example, control system 402 comprises a credentials module or device 406, a system rules module or device 408, a work-in-progress data store 410, a sub-system interface 412, a markup language module or device 414, and an interface 416. In one example, control system 402 may be connected to other systems in a configuration similar to control systems 212 and/or 312 illustrated in FIGS. 2-3. Accordingly, in one example, control system 402 may be configured to facilitate communication between one or more subsystems, such as systems 202-210 and 302-310 described in relation to FIGS. 2-3. In one example, interface 416 comprises the hardware (e.g. physical connection ports/cables, and the like) and/or supporting firmware and software for connecting control system 402 to one or more subsystems, such as systems 202-210. Specifically, in order to facilitate communication with one or more subsystems, control system 402 comprises subsystem interface 412. The subsystem interface 412 may be configured to execute one or more processes to establish compatibility between control system 402 and a selected subsystem, from those subsystems 202-210. In one example, subsystem interface 412 may comprise one or more processes executed to establish communication between one or more systems utilizing different programming languages, and the like. In a specific example, subsystem interface 412 comprises a markup language module or device 414 configured to execute one or more processes to generate, process, and/or read one or more documents generated using a markup language. As such, markup language module or device 412 may be configured to create and/or interpret extensible markup language (XML) documents used to communicate information between control system 402 and one or more subsystems, such as systems 202-210. Accordingly, various methods of communication of XML documents will be readily apparent to those of ordinary skill in the art, and said methods may be utilized with control system 402 without departing from the scope of the disclosures described herein.

In one example, control system 402 comprises a credentials module or device 406 configured to store login credentials/licenses for software processes associated with one or more of systems 202-210, and the like. In this way, control system 402 may interact with a software process as a virtual user. Specifically, a first system, such as sales configuration system 202, may communicate information, via control system 402, to design system 204. This interaction with design system 204 may be facilitated by license information/credentials stored in device 406, such that control system 402 is a virtual user of design system 204. Accordingly, it is not necessary for credentialed users of the sales configuration system 202 to also be credentialed users of the design system 204, of which the users of the sales configuration system 202 may have no knowledge or experience, and vice-versa. It is understood that communications between other systems 202-210 may be facilitated in the same way.

In another example, control system 402 comprises system rules device 408, which is configured to execute one or more processes based on one or more stored rules that govern the progression of a new order project through subsystems of a change management system, such as subsystems 202-210 of change management system 200. In one implementation, system rules device 408 may comprise rules that redirect a new order project to an earlier or later stage in a same or different subsystem (202-210) based on a change made in the same or a different subsystem (202-210). In another example, system rules device 408 includes one or more rules that do not allow a new order project to progress until one or more prerequisite fields/pieces of information are entered and logical for the new order project. These pieces of information may be or include specific information related to tracking of the project, approvals from one or more required parties, checks as to whether parallel stages of a project have been completed, checks as to whether required upstream stages of the project have been properly completed, among others. Accordingly, system rules device 408, upon detection of one or more rules violations, may be configured to execute one or more processes to automatically send a new order project back to an earlier stage of the project flow, and/or generate one or more warning messages to one or more users related to a problem with the new order project, and the like. It is understood that additional rules may be implemented within system rules device 408 to control the progression of a new order project within a change management system 200, and the like.

In one example, the work-in-progress data store 410 comprises a space in memory of the control system 402 configured to act as a temporary store of a new order project, or part thereof. In this way, data store 410 may be utilized to temporarily hold a new order project, or part thereof, such that it may not be changed by a first user while it is being addressed (e.g., edited, adjusted, worked on, etc.) by a second user. In this way, work-in-progress data store 410 is configured to execute one or more processes to reduce or avoid fragmentation of one or more parts of a new order project.

Figure 5A:
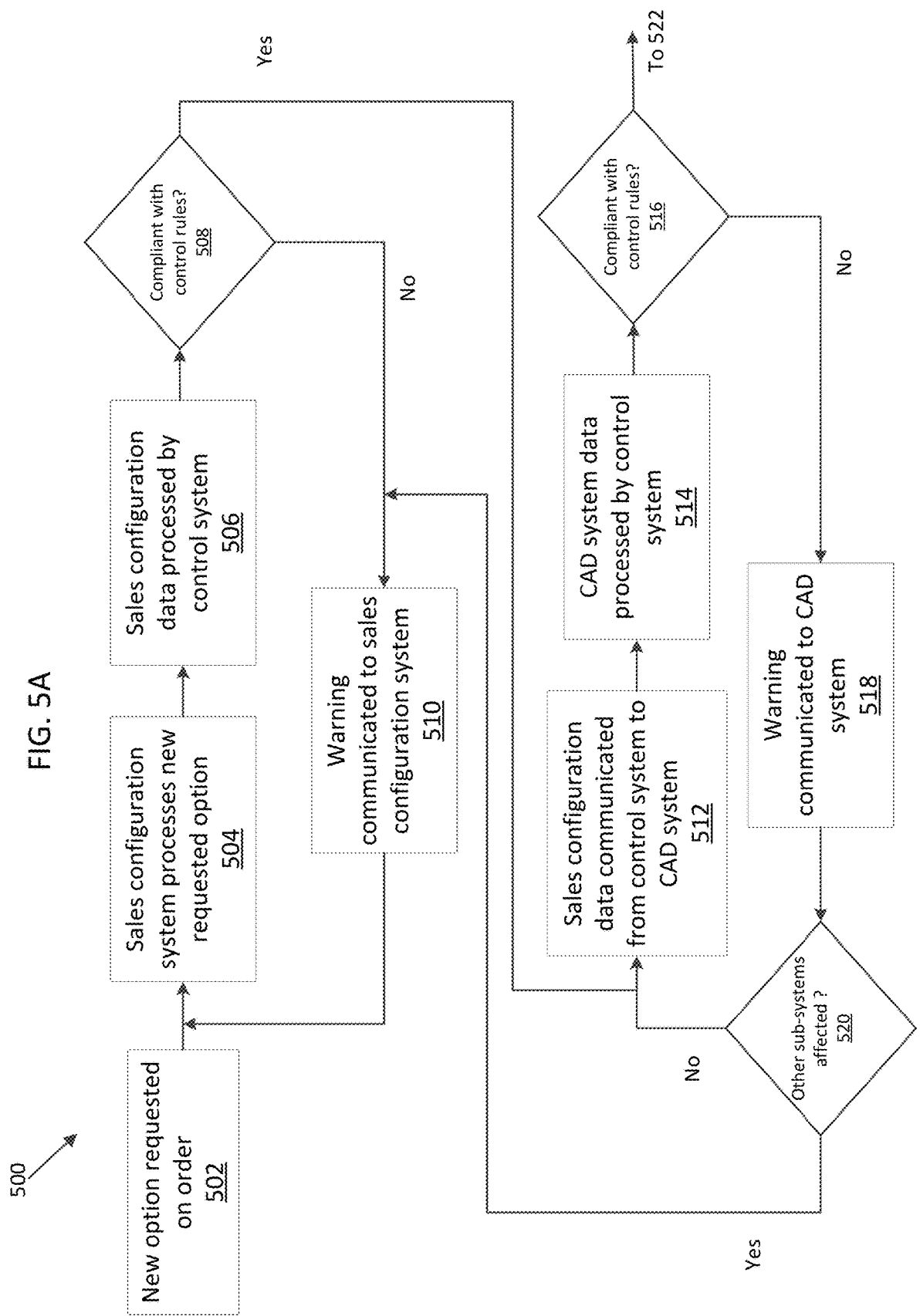
FIGS. 5A and 5B are a flowchart diagram of a new order project that may be executed in connection with the change management system as shown in FIGS. 1-4.
Figure 5B:
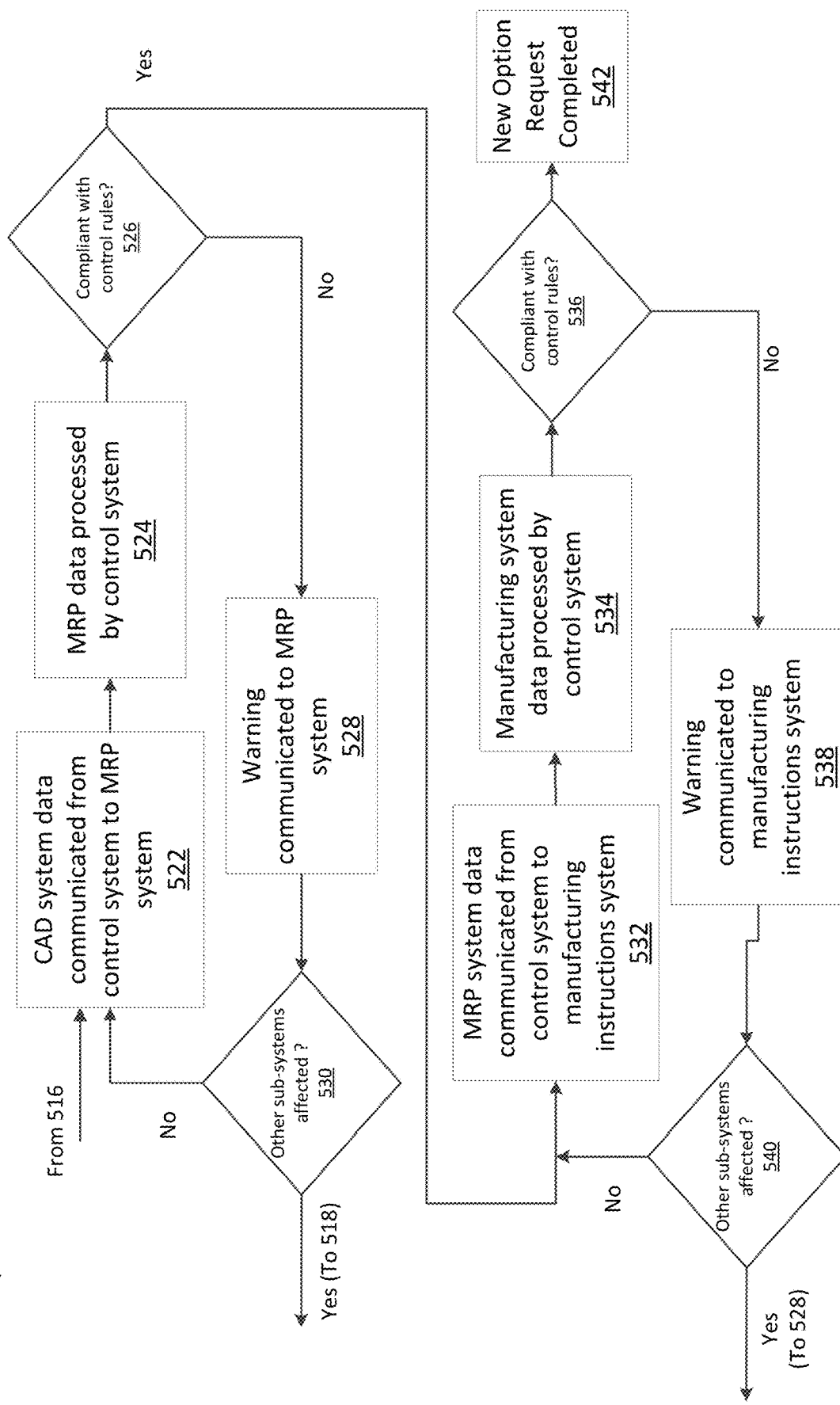

FIGS. 5A and 5B schematically depict a flowchart diagram of a new order project 500 processed by a change management system. In one example, project 500 may be executed by one or more of change management systems 100, 200, and/or 300. In this way, those blocks described in relation to FIGS. 5A and 5B may be executed by one or more of systems 202-212 and 302-312 from FIGS. 2-3, or other embodiments of such systems. In one example, project 500 is initiated at block 502 with a request, by a customer or other user, for a new order. Block 504 represents one or more processes executed by a sales configuration system, such a system 202, to process the requested new order. Block 506 may represent one or more processes executed to communicate data from the sales configuration system, such a system 202, to the control system, such as control system 212. In this way, the control system 212 may execute one or more processes to compare the available information for the new order to one or more rules associated with the processing of a new order by the sales configuration system 202. In one example, the one or more rules processed may check that various responsible parties (e.g. an engineering team, a quality control team, and a sales team, among others) have viewed and approved the requested new order and/or taken any actions necessary to ensure that the new order is completed correctly. Decision block 508 represents one or more processes configured to check, by control system 212, whether the data received from the sales configuration system 202 is compliant with the one or more control rules processed by the control system. In the event that the received data is not compliant with one or more control rules, project 500 proceeds to block 510, wherein action may be taken to address the issue, such as communicating a warning message to the sales configuration system 202. This warning message may be configured for display to a user and/or may be configured to automatically execute one or more processes in the sales configuration system.

Upon approval of the data received from the sales configuration system 202 as being compliant with one or more control rules, project 500 may continue to block 512. Block 512 represents one or more processes that may be executed to communicate sales configuration system data from the control system 212 to the design system 204. Accordingly, block 512 may additionally represent one or more processes executed to design the new order project within design system 204.

Block 514 may include one or more processes that may be executed to communicate data from the design system 204 to the control system 212. Accordingly, block 514 may execute one or more processes to check that the received data is compliant with one or more control rules, such as those rules stored in system rules device 408 from FIG. 4. Decision block 516 represents one or more processes configured to check that the one or more control rules have been met. If one or more control rules are violated, project 500 proceeds to block 518, and action may be taken to address the issue, such as communicating a warning to the design system 204. Additionally, decision point 520 represents one or more processes executed by the control system 212 to check whether the violation of one or more rules at decision block 516 affects one or more additional sub-systems. Accordingly, if a rule violation at decision block 516 is determined to affect another sub-system, project 500 is re-directed back to block 510.

Block 522 of project 500 represents one or more processes executed to communicate data from the design system 204 to the material requirements planning system 206. As such, block 522 may represent one or more processes executed to break down a model designed in the design system 204 into constituent components to be sourced by material requirements processing system 206. Block 524 represents one or more processes executed to communicate data from the material requirements processing system 206 to the control system 212 for analysis. Accordingly, control system 212 executes one or more processes to check that the data received from the material requirements processing system 206 complies with one or more control rules.

Decision block 526 represents one or more processes executed by the control system 212 to check for compliance of the received data with one or more control rules. If the data is not compliant with one or more control rules, project 500 proceeds to block 528, wherein action may be taken to address the issue, such as communicating a warning to the material requirements processing system 206. Decision block 530 further represents one or more processes executed by the control system 212 to check as to whether the identified noncompliance at block 526 affects one or more additional subsystems (such as systems 202-210). Accordingly, if another subsystem is determined to be affected, project 500 is redirected to block 518.

Block 532 represents one or more processes executed to communicate data from the material requirements processing system 206 to the manufacturing instructions system 208. Accordingly, block 532 may further represent one or more processes executed by the manufacturing instruction system 308 to break down the new order project into manufacturing instructions to be completed, e.g., by one or more technicians at one or more workstations of a manufacturing facility. Block 534 of project 500 represents one or more processes executed to communicate data from the manufacturing instructions system 206 to the control system 212. As such, block 534 may further represent one or more processes executed by the control system 212 to check that the data received from the manufacturing instructions system 206 complies with one or more control rules.

Decision block 536 indicates whether one or more of the control rules checked by the control system 212 has been violated. Accordingly, if one or more of the control rules has been violated, project 500 proceeds to block 538, wherein action may be taken to address the issue, such as communicating a warning to the manufacturing instructions system 208. Decision block 540 represents one or more processes executed by control system 212 to check as to whether the noncompliance identified at decision block 536 affects another subsystem of change management system 200, and the like. If it is determined, by control system 212, that the noncompliance identified at block 536 affects another subsystem (from subsystems 202-210), project 500 proceeds to block 528. If, however, at decision block 536, the manufacturing instructions system data is determined to be compliant with the control rules, project 500 proceeds to block 542 wherein the new order request is completed. Accordingly, block 542 may represent one or more processes executed to display results of the new order project 500 to a requestor. In this way, block 542 may represent one or more processes to communicate a cost estimate to a requestor requesting the new order project 500. Additionally or alternatively, block 542 may represent one or more processes to communicate finalized designs and/or project details of a new order project 500 to a requestor (a client, and the like). As such block 542 may utilize one or more of a display device and/or communication via a communication network, and the like.

Those of ordinary skill in the art will recognize various additional and/or alternative project flowcharts that may be implemented in addition to/as an alternative to that project 500 described in relation to FIGS. 5A and 5B, and without departing from the disclosures described herein. For example, control system, such as control system 402, may execute one or more processes to compare received data to one or more control rules, such as those rules stored in system rules device 408, and in response to a violation of one or more of said rules, reject a design of a new order, thereby ending a new order project. Additionally, it will be readily apparent to those of ordinary skill that the control system, such as control system 402 from FIG. 4, may allow for automatic and/or manual progression of a project according to a predetermined project flow/changes to a project flow (redirecting project steps). Furthermore, control system 402, and in particular, system rules device 408, may implement one or more project rules that govern the type of information visible to a user based upon, among others, a user's job role within the manufacturing company, or the status of the new order project.

Figure 6:
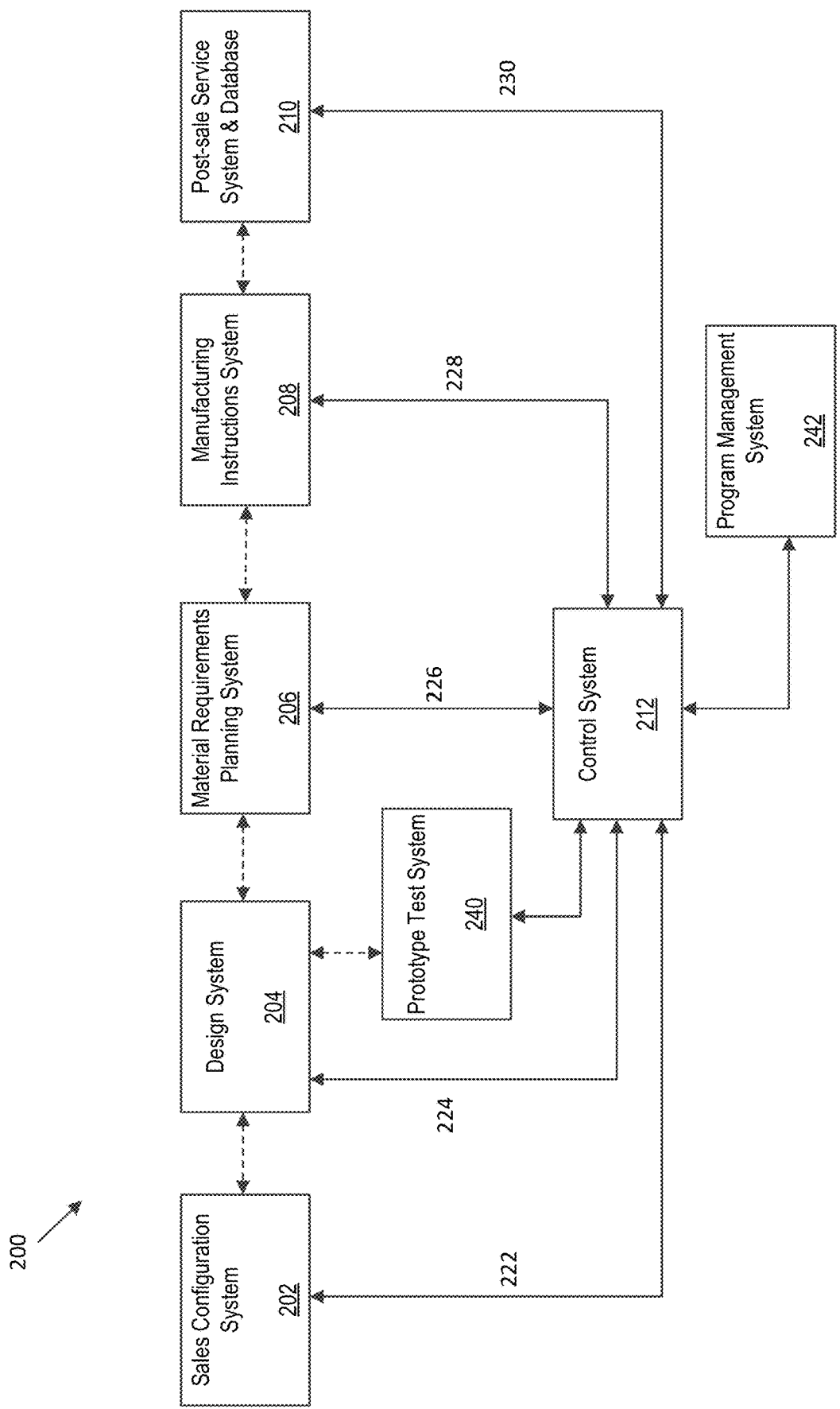
FIG. 6 is a schematic block diagram of another implementation of a change management system according to aspects of the disclosure.

In one embodiment, the design system 204 may further include a prototype test system 240 that is configured for assistance in prototyping and testing a designed component before advancing the order further in the system 200, as shown in FIG. 6. For example, the prototype test system 240 may be used when a new option or combination of options is required in a new engineering product ordered. In one embodiment, the design system 204 may transmit information to the prototype test system 240 (e.g., via the control system 212), for use in obtaining and testing a prototype. After the prototype is obtained and tested, the prototype test system 240 transmits information back to the design system 204 (e.g., via the control system 212) regarding the success/failure of the conducted tests. If the tests were successful, the design system 204 and the control system 212 can proceed further with the order. If the tests were not successful, the design system 204 and the control system 212 initiate further design work to revise the design, and the loop is repeated. It is understood that aspects of the process of FIGS. 5A and 5B may be applied to the exchange of information and progress related to the prototype test system 240, such as application of control rules and checking whether non-compliance affects other sub-systems.

In one embodiment, the control system 212 may further include a program management system 242, as also shown in FIG. 6. The program management system 242 is configured for managing a program (or multiple related programs), where each program includes multiple related projects, each of which projects include one or more related requested changes or orders. It is understood that a "program" used in this sense does not refer to a computer program, but to a collection of multiple different related projects or orders. Various related changes, projects, and/or programs may have several inter-dependencies to other such related changes, projects, and/or programs. Each project may have a specific priority, e.g., based on business needs, and each project may require a certain amount of resource commitment and budgetary commitment to successfully complete. The program management system 242 works with the control system to initiate changes or orders at the appropriate time based on project priority, resource and budget availability, inter-dependencies, and other such considerations. Accordingly, the program management system 242 may receive information related to project priority, resource and budget availability, inter-dependencies, and other such information from the control system 212, from other sub-systems, and/or from input from various responsible parties.

Advantageously, the control systems described herein, such as systems 212, 312, and/or 402, represent unconventional hardware and/or software solutions directed towards the issues of improving efficiency in controlling communication of data between sub-systems, such as sub-systems 202-212. In this way, the systems and methods described herein may be utilized to implement as well as track authorization and/or approval data between systems that may conventionally lack such control and oversight.

Those of ordinary skill in the art will further recognize that the systems and methods described herein include non-routine processes and methods, described in the foregoing disclosures, and related to issues of change management in an enterprise (engineering company, management company, sales company, among others). Further, those of ordinary skill in the art will recognize that the systems and methods described herein represent solutions to significant issues that were previously not well understood or addressed, and specifically related to challenges encountered in the control of, among others, engineering operations related to change management. As such, the change management systems, such as systems 200 and 300, represent advances in the understanding of centralized control of data between one or more sub-systems 202-210, and the like.

The various embodiments described herein may be implemented by specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the computer arts will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from and/or write data to the storage medium. In the alternative, the storage medium may be integral to the processor. The processor and the storage medium may reside in an ASIC. The ASIC may reside in a user device. In the alternative, the processor and the storage medium may reside as discrete components in a user device.

The embodiments of systems, methods, and computer program products described herein provide advantages over existing systems, methods, and computer program products. For example, the use of a control system to manage communication and processing among various sub-systems can increase the efficiency and reliability of the process. As another example, the use of the control system to manage communication and processing among the sub-systems streamlines and increases the efficiency of the process for designing and implementing a new engineering component. As a further example, applying rules governing completion of an order can help ensure that engineering products produced under the order function properly and are produced at a predictable cost, and may also reduce or eliminate loss due to purchase of components that are excessive or unnecessary in completing the order. Still other benefits and advantages are explicitly or implicitly described herein and/or recognized by those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Relative terms such as "first," "second," etc., as used herein, are intended for illustrative purposes only and do not limit the embodiments in any way. Additionally, the term "plurality," as used herein, indicates any number greater than one, either disjunctively or conjunctively, as necessary, up to an infinite number. Accordingly, it will be understood that the invention is not to be limited to the embodiments disclosed herein, but is to be understood from the following claims, which are to be interpreted as broadly as allowed under the law.

What is claimed is:

1. A computer-implemented management system comprising:
   at least one memory configured for storing information;
   at least one computer processor connected to the at least one memory;
   a plurality of sub-systems operated by the at least one computer processor, comprising:
      a sales configuration system configured for receiving, at the at least one computer processor, a request for a project for implementing a new engineering component, wherein the new engineering component comprises a tangible product;
      a design system configured for receiving design input data to create a computer-implemented model of the new engineering component using the at least one computer processor;
      a material requirements planning system configured for identifying components necessary for implementing the new engineering component using the at least one computer processor;
      a manufacturing instructions system configured for creating a plurality of instructions for implementing the new engineering component, including instructions for manufacturing the tangible product, using the at least one computer processor; and
      a service system including a database stored in the memory, the service system configured for receiving a project information at the at least one computer processor from at least one other sub-system and storing the project information in the database; and
   a control system operated by the at least one computer processor and connected to all of the plurality of sub-systems, wherein the control system is configured for controlling exchange of information between two or more of the plurality of sub-systems for completion of the project, wherein the control system is configured for receiving the information for completion of the project, analyzing the information based on a set of rules, and determining an action to be taken by one or more of the plurality of sub-systems, and wherein the control system is further configured such that when the information is received from a first sub-system of the plurality of sub-systems, and the information complies with the rules, the control system is configured for determining that the action is to be taken by a subsequent sub-system plurality of sub-systems to advance completion of the project, and when the information does not comply with the rules, the control system is configured for determining that the action is to be taken by the first sub-system to supplement the information to comply with the rules.

2. The management system of claim 1, wherein the control system is configured such that the information is exchanged between the two or more sub-systems by a first sub-system transmitting the information to the control system, and the control system then transmitting the information to a second sub-system.

3. The management system of claim 1, wherein the sub-systems are configured for displaying selected information to a user, and wherein the selected information further includes an indication of any changes in the selected information that were not previously displayed to the user.

4. The management system of claim 1, wherein the tangible product is a sub-component of a larger engineering product, and wherein the sales configuration system is configured for receiving quoting information regarding at least one of a feasibility, a complexity, a timeline, and a cost associated with implementing the new engineering component, the sales configuration system is further configured for generating a quote for the new engineering component based on the quoting information, and the manufacturing instructions system is further configured such that the plurality of instructions include instructions for installing the sub-component on the larger engineering product.

5. The management system of claim 1, wherein the design system includes computer-aided design software configured for creating the computer-implemented model.

6. The management system of claim 1, wherein the material requirements planning system is further configured for determining a current inventory status of the components identified.

7. The management system of claim 1, wherein the new engineering component is a sub-component of an engineering product, and wherein the plurality of instructions created by the manufacturing instructions system include an instruction for installing the new engineering component on the engineering product.

8. The management system of claim 1, wherein the control system and each of the sub-systems are operated by separate computer program modules stored in the at least one memory.

9. A computer-implemented management system comprising:
at least one memory configured for storing information;
at least one computer processor connected to the at least one memory;
a plurality of sub-systems operated by the at least one computer processor, the sub-systems configured for executing a plurality of processes for completing an order for production of a new engineering component comprising a tangible product; and
a control system operated by the at least one computer processor and connected to all of the plurality of sub-systems, wherein the control system is configured for controlling exchange of information among the sub-systems and for controlling execution of the plurality of processes for completing the order, including manufacturing the new engineering component, comprising:
receiving, at the at least one computer processor, first data from a first sub-system of the plurality of sub-systems after the first sub-system executes a first process;
comparing, by the at least one computer processor, the first data to a first control rule to determine compliance with the first control rule;
transmitting, by the at least one computer processor, the first data to a second sub-system of the plurality of sub-systems for execution of a second process if the first data is determined to comply with the first control rule; and
transmitting, by the at least one computer processor, an instruction to the first sub-system to remedy non-compliance if the first data is determined to not comply with the first control rule,
wherein, if the first data is determined to not comply with the first control rule, the control system is further configured for determining whether at least one other sub-system of the plurality of sub-systems is affected by the non-compliance.

10. The management system of claim 9, wherein the control system is further configured for controlling exchange of the information among the sub-systems and for controlling execution of the plurality of processes until all of the plurality of processes are executed and the order is complete.

11. The management system of claim 9, wherein, if at least one other sub-system is determined to be affected by the non-compliance, the control system is further configured for transmitting an instruction to the at least one other sub-system to remedy non-compliance.

12. The management system of claim 9, wherein the plurality of sub-systems comprise:
a sales configuration system configured for receiving the order;
a design system configured for creating a computer-implemented model of the new engineering component;
a material requirements planning system configured for identifying components necessary for implementing the new engineering component; and
a manufacturing instructions system configured for creating a plurality of instructions for implementing the new engineering component, including instructions for manufacturing the tangible product.

13. The management system of claim 9, wherein the control system and each of the sub-systems are operated by separate computer program modules stored in the at least one memory.

14. The management system of claim 9,
wherein the plurality of sub-systems are configured for displaying selected information to a user, and wherein the selected information further includes an indication of any changes in the selected information that were not previously displayed to the user.

15. The management system of claim 12, wherein the control system is configured for receiving the information for completing the order, analyzing the information based on a set of rules, and determining an action to be taken by one or more of the sub-systems.

16. The management system of claim 15, wherein the control system is configured such that the information is exchanged between the two or more sub-systems by a first sub-system transmitting the information to the control system, and the control system then transmitting the information to a second sub-system.

17. The management system of claim 12, wherein the tangible product is a sub-component of a larger engineering product, and wherein the sales configuration system is configured for receiving quoting information regarding at least one of a feasibility, a complexity, a timeline, and a cost associated with implementing the new engineering component, the sales configuration system is further configured for generating a quote for the new engineering component based on the quoting information, and the manufacturing instructions system is further configured such that the plurality of instructions include instructions for installing the sub-component on the larger engineering product.

18. The management system of claim 12, wherein the design system includes computer-aided design software configured for creating the computer-implemented model.

19. The management system of claim 12, wherein the material requirements planning system is further configured for determining a current inventory status of the components identified.

20. The management system of claim 12, wherein the new engineering component is a sub-component of an engineering product, and wherein the plurality of instructions created by the manufacturing instructions system include an instruction for installing the new engineering component on the engineering product.

21. The management system of claim 14, wherein the control system and each of the sub-systems are operated by separate computer program modules stored in the at least one memory.

22. A method for manufacturing a new engineering component comprising a tangible product, the method comprising:
receiving, at a sales configuration system operated by at least one processor, a request for a project for implementing the new engineering component;
receiving, at a design system operated by the at least one processor, design input data;
creating, at the design system using the at least one processor, a computer-implemented model of the new engineering component;
identifying, at a material requirements planning system operated by the at least one processor, components necessary for implementing the new engineering component;
creating, at a manufacturing instructions system operated by the at least one processor, a plurality of instructions for implementing the new engineering component, including instructions for manufacturing the new engineering component;
receiving, at a service system operated by the at least one processor and including a database stored in at least one memory, a project information from at least one other sub-system;
storing, by the service system using the at least one processor, the project information in the database;
controlling a plurality of sub-systems including the sales configuration system, the design system, the material requirements planning system, the manufacturing instructions system, and the service system, using a control system operated by the at least one processor and connected to all of the plurality of sub-systems, wherein the control system controls exchange of information between two or more of the sub-systems for completion of the project,
wherein the control system, using the at least one processor, receives the information for completion of the project, analyzes the information based on a set of rules, and determines an action to be taken by one or more of the sub-systems, and
wherein when the information is received from a first sub-system, and the information complies with the rules, the control system is configured for determining that the action is to be taken by a subsequent sub-system to advance completion of the project, and when the information does not comply with the rules, the control system is configured for determining that the action is to be taken by the first sub-system to supplement the information to comply with the rules; and
manufacturing the new engineering component using one or more of the computer-implemented model created at the design system, the components identified by the material requirements planning system, and the instructions created at the manufacturing instructions system.

* * * * *